(12) United States Patent
Onoda et al.

(10) Patent No.: US 11,561,171 B2
(45) Date of Patent: Jan. 24, 2023

(54) OPTICAL ANALYZER

(71) Applicant: HORIBA Advanced Techno, Co., Ltd., Kyoto (JP)

(72) Inventors: Takuya Onoda, Kyoto (JP); Issei Yokoyama, Kyoto (JP); Tomoko Seko, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 273 days.

(21) Appl. No.: 16/837,296

(22) Filed: Apr. 1, 2020

(65) Prior Publication Data

US 2020/0333248 A1  Oct. 22, 2020

(30) Foreign Application Priority Data

Apr. 19, 2019 (JP) .............................. JP2019-079958

(51) Int. Cl.
*G01N 21/55* (2014.01)
*B01L 3/00* (2006.01)

(52) U.S. Cl.
CPC .......... *G01N 21/55* (2013.01); *B01L 3/50273* (2013.01); *B01L 2300/0877* (2013.01)

(58) Field of Classification Search
CPC ..................... G01N 21/55; B01L 2300/0877
See application file for complete search history.

(56) References Cited

U.S. PATENT DOCUMENTS

| 9,448,057 B2 * | 9/2016 | Jiang .................. | G01B 9/02068 |
| 2004/0233453 A1 | 11/2004 | Buijs et al. | |
| 2012/0162651 A1 * | 6/2012 | Glover ............... | G01N 33/1893 |
| | | | 356/434 |

FOREIGN PATENT DOCUMENTS

| EP | 2896948 | 7/2015 |
| JP | 03-102244 | 4/1991 |
| JP | 2002-082018 | 3/2002 |
| JP | 2002-107294 | 4/2002 |
| JP | 2014-202658 | 10/2014 |
| JP | 2015-132610 | 7/2015 |
| JP | 2015-137983 | 7/2015 |

OTHER PUBLICATIONS

Official Communication Issued in European Patent Application No. 20166927.2, dated Sep. 23, 2020.
Official Communication Received in Japanese Patent Application No. 2019-079958, dated Sep. 13, 2022.

* cited by examiner

*Primary Examiner* — Rebecca C Bryant
(74) *Attorney, Agent, or Firm* — Greenblum & Bernstein, P.L.C.

(57) ABSTRACT

The present invention intends to enable light path length to be kept the same between sample measurement and reference measurement and thereby improve measurement accuracy, and is an optical analyzer that analyzes a sample flowing through a pipe having translucency. In addition, the optical analyzer includes: a light source unit that has a light source and a condenser lens; a light detection unit that detects light of the light source unit; and a support mechanism that movably supports the light source unit and the light detection unit. Further, the support mechanism moves the light source unit and the light detection unit between a sample measurement position and a reference measurement position.

7 Claims, 5 Drawing Sheets

OPTICAL ANALYZER

TECHNICAL FIELD

The present invention relates to an optical analyzer that measures component concentration of a chemical or the like used in, for example, a semiconductor manufacturing process or the like.

BACKGROUND ART

As disclosed in Patent Literature 1, there has been conventionally considered an optical analyzer that moves an optical system to thereby switch between reference measurement for acquiring a reference light intensity signal and sample measurement for acquiring a sample light intensity signal.

This optical analyzer has a pair of reflective mirrors that reflect light from a light source, and is configured to, with the light source and a light detector fixed, enable the pair of reflective mirrors to be moved between a sample measurement position to irradiate a measurement cell with light and a reference measurement position not to irradiate the measurement cell with light.

CITATION LIST

Patent Literatures

Patent Literature 1: Japanese Unexamined Patent Application Publication No. 2015-137983

SUMMARY OF INVENTION

Technical Problem

However, as in the above-described optical analyzer, the configuration in which the pair of reflective mirrors is moved to switch a light path makes a difference in light path length (an optical distance from the light source to the light detector) between the sample measurement and the reference measurement. Also, when the sample measurement position or the reference measurement position is displaced by the positional reproducibility of the pair of reflective mirrors, the light path length is changed at each sample measurement, or the light path length is changed at each reference measurement. The change in the light path length as described causes a measurement error, making it difficult to accurately control the concentration of a predetermined component of a chemical.

Therefore, the present invention has been made in order to solve the above-described problems, and a main object thereof is to enable light path length to be kept the same between sample measurement and reference measurement and thereby improve measurement accuracy.

Solution to Problem

That is, the optical analyzer according to the present invention is one that analyzes a sample flowing through a pipe having translucency, and includes: a light source unit that has a light source and a condenser lens; a light detection unit that detects light of the light source unit; and a support mechanism that movably supports the light source unit and the light detection unit. In addition, the support mechanism is one that moves the light source unit and the light detection unit between a sample measurement position allowing the light detection unit to detect the light of the light source unit via the pipe and a reference measurement position allowing the light detection unit to detect the light of the light source unit without the pipe.

Since this optical analyzer is configured to, between the sample measurement position and the reference measurement position, move the light source unit having the light source and the condenser lens and the light detection unit that detects the light of the light source unit, as compared with a configuration in which a pair of reflective mirrors is moved as conventional, a change in light path length can be reduced. As a result, the light path length can be kept the same between the sample measurement and the reference measurement to thereby improve measurement accuracy.

In recent years, there has been considered an in-line type optical analyzer configured to attach an optical analyzer to a pipe through which a chemical flows and measure the concentration of a predetermined component of the chemical, like a chemical monitor or the like. Here, the pipe through which the chemical flows is often of a cylindrical shape, and when radiating parallel light or light close to it as in the case of a rectangular cell, a change in refractive index caused depending on the temperature or the concentration of a liquid sample such as a chemical makes it easy to change a light amount detected by a light detector. As a result, a measurement error occurs, making it difficult to accurately control the concentration of a predetermined component of a chemical.

Therefore, it is desirable that the condenser lens of the light source unit is one that condenses the light of the light source inside of the pipe in the sample measurement position.

In this configuration, since the condenser lens of the light source unit condenses the light of the light source inside of the pipe in the sample measurement position, even when the refractive index of the sample is changed by a change in the temperature or concentration of the sample, a change in refraction caused when the light passes through the pipe and the sample can be reduced. As a result, the effect of a change in the refractive index of the sample can be made less likely to thereby improve measurement accuracy.

In order to make a change in light path length as small as possible between the sample measurement and the reference measurement, it is desirable that the support mechanism is one that moves the light source unit and the light detection unit between the sample measurement position and the reference measurement position without changing the relative position between the light source unit and the light detection unit.

As an embodiment for making constant the relative position between the light source unit and the light detection unit, it is conceivable that the support mechanism includes: a fixedly provided base member; a connecting member that connects between the light source unit and the light detection unit; and a slide drive part that is provided on the base member and slidingly moves the light source unit and the light detection unit, which are connected by the connecting member, with respect to the base member.

In this configuration, since the light source unit and the light detection unit are integrated by the connecting member, the one slide drive part can slidingly move the light source unit and the light detection unit at once. As a result, the optical analyzer can be reduced in size.

Here, it is imaginable that the light detection unit has a spectroscope. In this case, the light detection unit is heavier than the light source unit.

In such a case, in order to stably slidingly move the light source unit and the light detection unit integrated by the connecting member, it is desirable that the slide drive part includes a linear guide provided interposed between the base member and the light detection unit, and the light source unit and the light detection unit are movably supported by the linear guide with respect to the base member.

In order to accurately measure the absorbance of the sample, it is desirable to further include a positioning part that performs positioning so that the center of the pipe is positioned on the light axis of the light source unit in the sample measurement position.

In order to surely position even pipes having different sizes, it is desirable that the positioning part is configured to be replaceable depending on the diameter of the pipe.

Advantageous Effects of Invention

According to the present invention described above, it is possible not only to keep the light path length the same between the sample measurement and the reference measurement but to make the effect of a change in the refractive index of the sample less likely, and thereby improve measurement accuracy.

DESCRIPTION OF EMBODIMENTS

In the following, an optical analyzer according to one embodiment of the present invention will be described with reference to the drawings.

<1. Analyzer Configuration>

The optical analyzer 100 of the present embodiment is one that measures component concentration of a chemical or the like used in, for example, a semiconductor manufacturing process or the like. Here, as the chemical, SC-1 (an ammonia-hydrogen peroxide solution). SC-2 (a hydrochloric acid-hydrogen peroxide solution), SPM (a sulfuric acid-hydrogen peroxide solution), FPM (a hydrofluoric acid-hydrogen peroxide solution), BHF (a buffered hydrofluoric acid solution), or the like can be cited. In addition, the concentration or the like of the chemical is controlled using the concentration obtained by the optical analyzer 100.

Specifically, the optical analyzer 100 is one that is detachably attached to, for example, a cylindrical pipe H having translucency to measure component concentration of a liquid sample flowing through the pipe H with use of a spectroscopic analysis method. In addition, the pipe H is formed of a fluorine-based resin (PFA) superior in chemical resistance.

Figure 1:
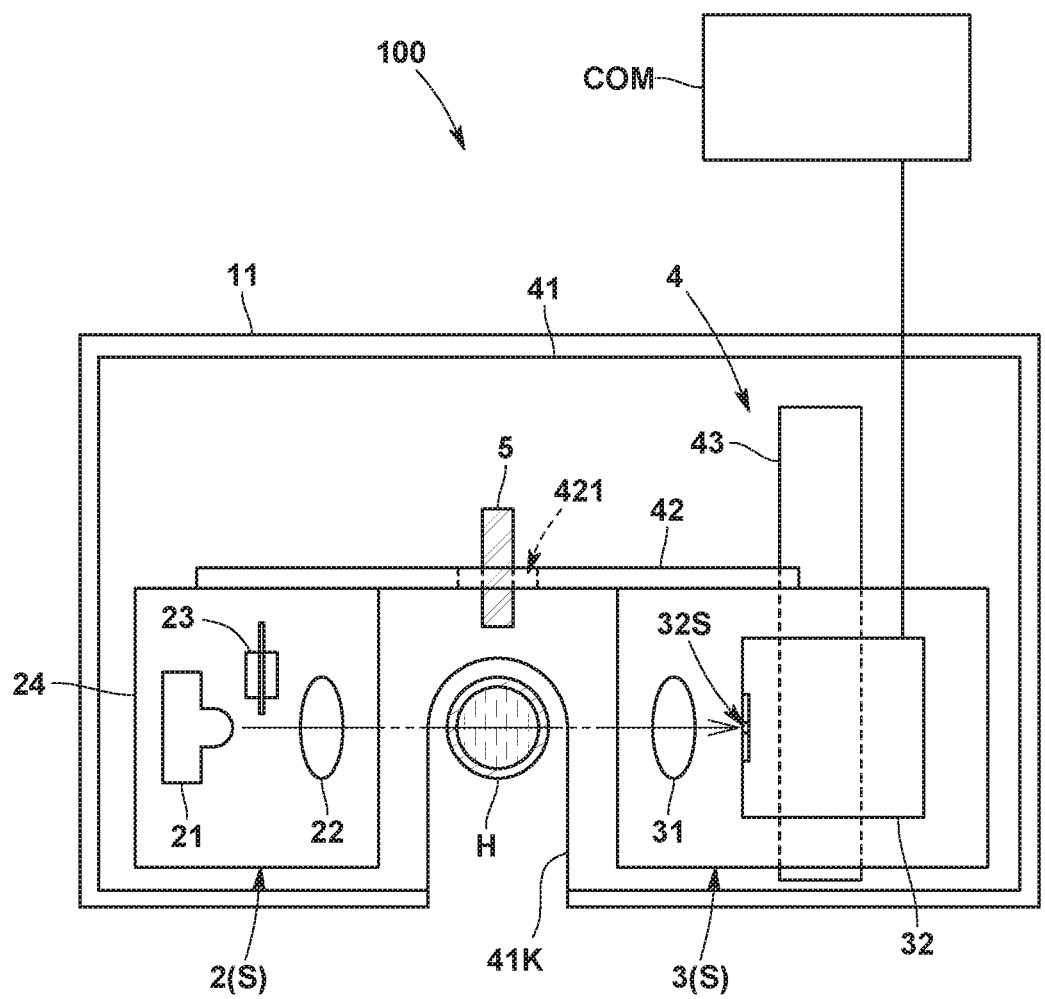
FIG. 1 is an overall schematic diagram illustrating a sample measurement state of an optical analyzer according to one embodiment of the present invention.
Figure 2:
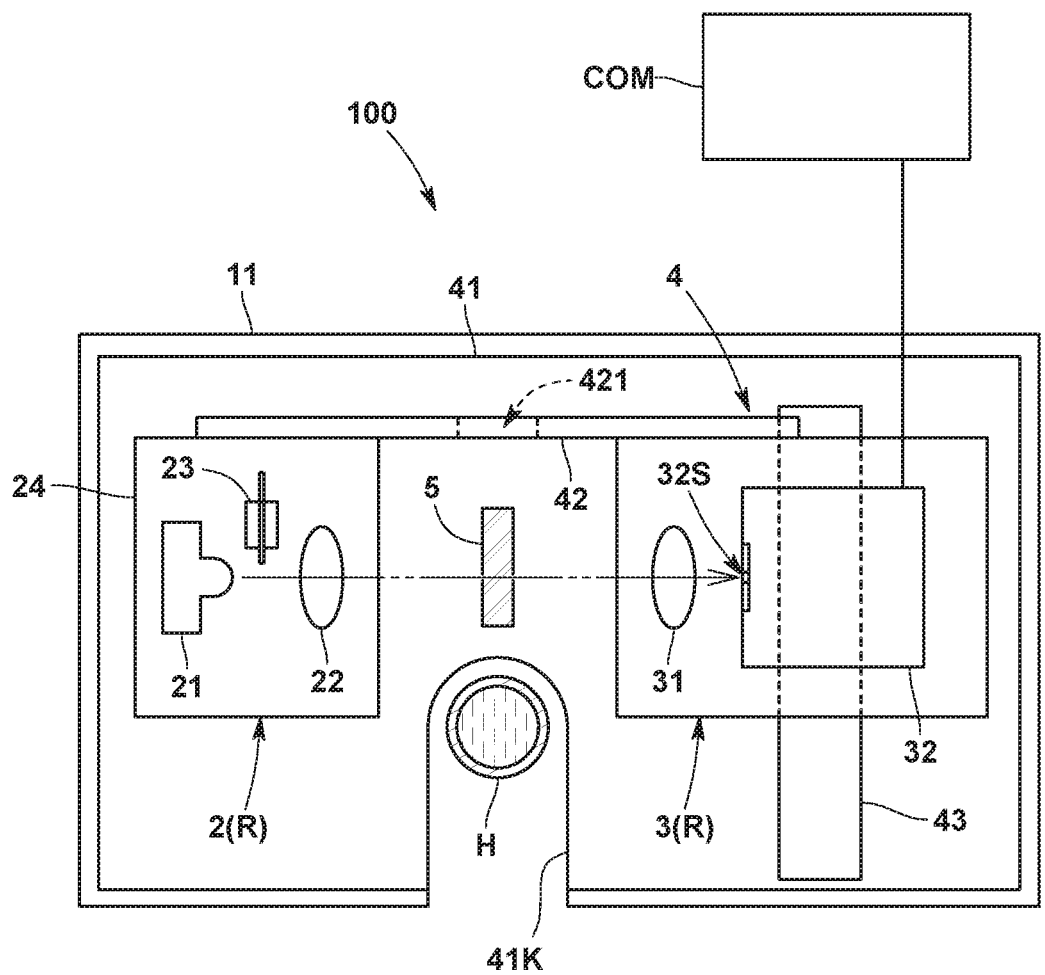
FIG. 2 is an overall schematic diagram illustrating a reference measurement state of the optical analyzer according to the same embodiment.
Figure 3:
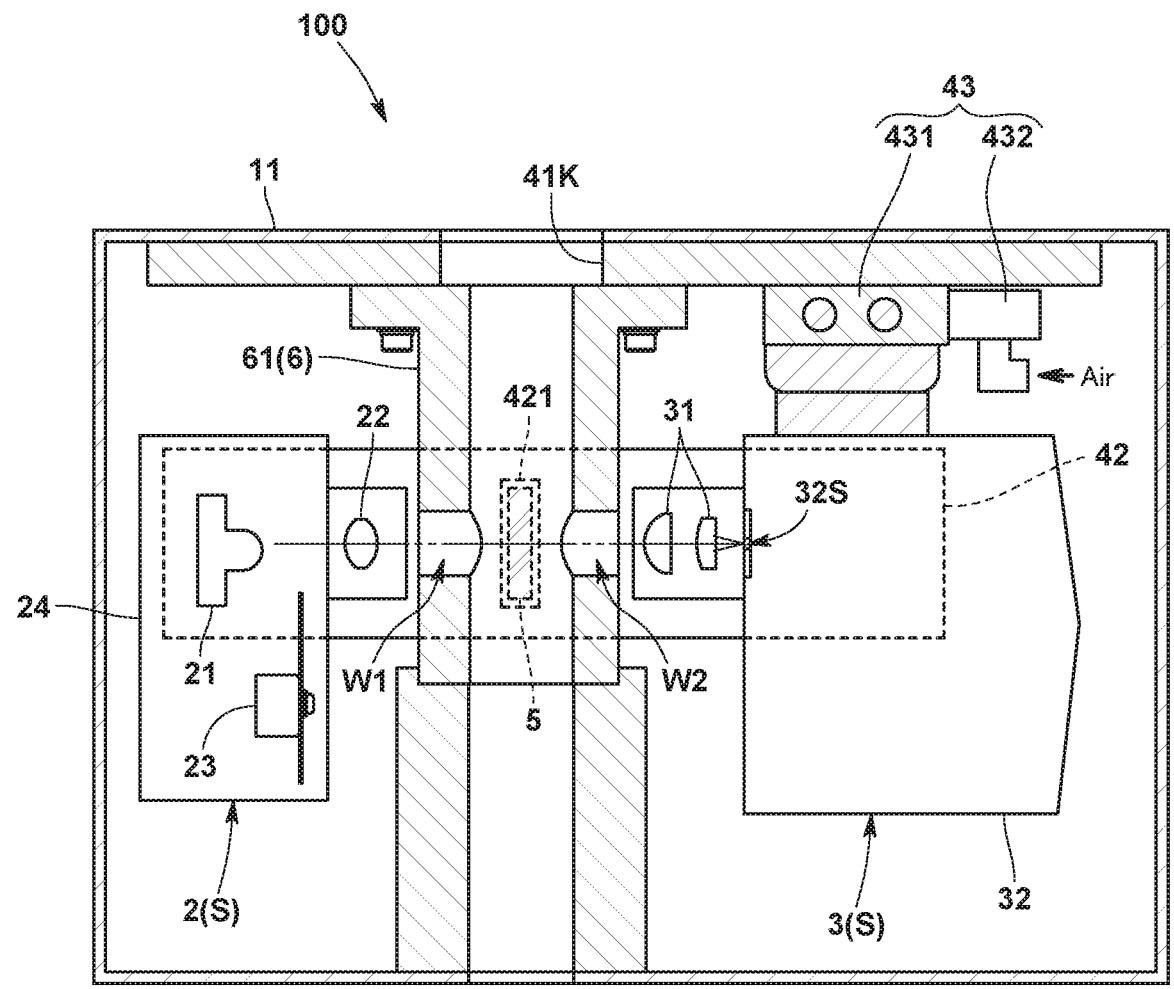
FIG. 3 is a cross-sectional view illustrating the details of a support mechanism in the same embodiment.

Further, as illustrated in FIG. 1 to FIG. 3, the optical analyzer 100 includes: a light source unit 2; a light detection unit 3 that detects the light of the light source unit 2; and a support mechanism 4 that movably supports the light source unit 2 and the light detection unit 3.

The light source unit 2 includes a light source 21 and a condenser lens 22. Also, between the light source 21 and the condenser lens 22, a shutter mechanism 23 for shutting off the light of the light source 21 is provided.

The light source 21 is an LED. The LED is, for example, a near-infrared LED that emits light having wavelengths in the near-infrared region or a visible LED that emits light having wavelengths in the visible region, and appropriately selected depending on the type of the liquid sample as a measurement target. Also, the condenser lens 22 is one that condenses the light of the light source 21 to irradiate the pipe H with it.

The light detection unit 3 has a condenser lens 31 and a spectroscope 32.

The condenser lens 31 is one that condenses the light of the light source unit 2 toward an incident slit 32S of the spectroscope 32.

The spectroscope 32 is one that disperses the light incident through the incident slit 32S and detects the resulting optical spectrum (light amounts at respective wavelengths). Optical spectrum data (light intensity signal) obtained by the spectroscope 32 is outputted to an arithmetic part of an information processor COM. Then, the arithmetic part of the information processor COM calculates the absorbance spectrum of the liquid sample from the optical spectrum obtained by the spectroscope 32, and calculates the concentration of a component contained in the liquid sample with use of the absorbance spectrum.

The support mechanism 4 is one that moves the light source unit 2 and the light detection unit 3 between a sample measurement position S and a reference measurement position R.

Here, the sample measurement position S is a position that allows the pipe H to be positioned between the light source unit 2 and the light detection unit 3 and allows the light detection unit 3 to detect the light of the light source unit 2 via the pipe H. Also, the reference measurement position R is a position that allows the pipe H not to be positioned between the light source unit 2 and the light detection unit 3 and allows the light detection unit 3 to detect the light of the light source unit 2 without the pipe H. In the present embodiment, light path length in the sample measurement position S and that in the reference measurement position R are the same.

Specifically the support mechanism 4 is one that moves the light source unit 2 and the light detection unit 3 between the sample measurement positon S and the reference measurement position R without changing the relative position between the light source unit 2 and the light detection unit 3.

In the present embodiment, the support mechanism 4 is configured not only to make the relative position between the light source unit 2 and the light detection unit 3 in the sample measurement position S the same as that between the light source unit 2 and the light detection unit 3 in the reference measurement position R, but to make the same the relative position between the light source unit 2 and the light detection unit 3 even while they are moving between the positions (S→R, R→S).

In addition, the support mechanism 4 includes: a base member 41 provided fixedly to the analyzer body side; a connecting member 42 that connects between the light source unit 2 and the light detection unit 3; and a slide drive part 43 that is provided on the base member 41 and slidingly moves the light source unit 2 and the light detection unit 3, which are connected by the connecting member 42, with respect to the base member 41.

The base member 41 is one that is of a flat plate shape and positions the pipe H, and an end edge part thereof is formed with a cutout part 41K for surrounding the pipe H.

Also, the base member 41 is provided with a reference optical member 5 positioned between the light source unit 2 and the light detection unit 3 in the reference measurement position R. The reference optical member 5 is an optical element that changes the focal position of the light of the light source unit 2 so as to make a focal position in the reference measurement position R substantially the same as a focal position when the light passing through the pipe H is condensed by the condenser lens 31 of the light detection unit. In addition, the reference optical member 5 may be one that adjusts a detected light amount at the light detection unit 3 in reference measurement. Note that a configuration in which the reference optical member 5 is not provided is also acceptable.

The connecting member 42 is one that connects between the light source unit 2 and the light detection unit 3 so that the condenser lens 22 of the light source unit 2 and the condenser lens 31 of the light detection unit 3 face each other at a predetermined interval.

In the present embodiment, one end part of the connecting member 42 is connected to a holding body 24 that is, for example, of a flat plate shape and holds the light source 21 and condenser lens 22 of the light source unit 2. Also, the other end part of the connecting member 42 is connected to the casing of the spectroscope 32 of the light detection unit 3. This allows a light path from the light source unit 2 to the light detection unit 3 to be linear. Specifically, the connecting member 42 is connected to the holding body 24 and the spectroscope 32 on the reference measurement position R side, and formed with an optical member avoiding part 421 such as a through-hole so as to avoid interference with the reference optical member 5 when the respective units 2 and 3 are moved to the sample measurement position S. This enables a dimension in the movement direction of the support mechanism 4 to be reduced.

The slide drive part 43 includes: a linear guide 431 provided interposed between the base member 41 and the light detection unit 3; and an actuator 432 for slidingly moving the light detection unit 3 along the linear guide 431.

The linear guide 431 supports the light source unit 2 and the light detection unit 3 so that they can linearly move between the sample measurement position S and the reference measurement position R. A slider of the linear guide 431 is connected to the casing of the spectroscope 32 of the light detection unit 3. This allows the light source unit 2 and the light detection unit 3 to be movably supported by the linear guide 431 with respect to the base member 41.

The actuator 432 is configured using, for example, an air cylinder. Besides, the actuator 432 may be one using: a motor; and a rotation-linear movement converter that converts the rotation of the motor to a linear movement, such as a ball screw mechanism.

Figure 4:
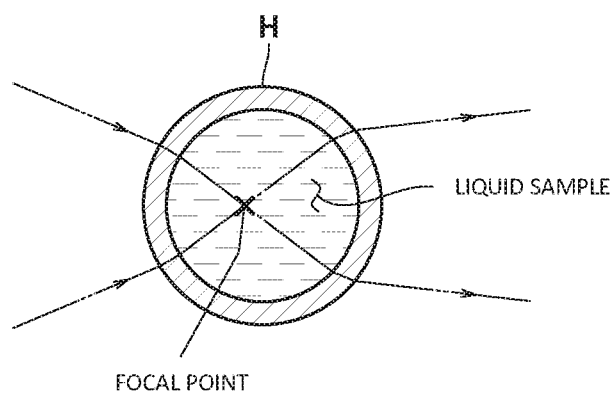
FIG. 4 is a cross-sectional view illustrating a focal point in the same embodiment.

As illustrated in FIG. 4, the condenser lens 22 of the light source unit 2 in the sample measurement position S condenses the light inside of the pipe H. That is, the incident angle of the light incident on the outer surface of the cylindrical pipe H, which is an angle formed with a tangent to the outer surface at the position of the incidence, is small as compared with the case where the pipe H is irradiated with parallel light.

Figure 5:
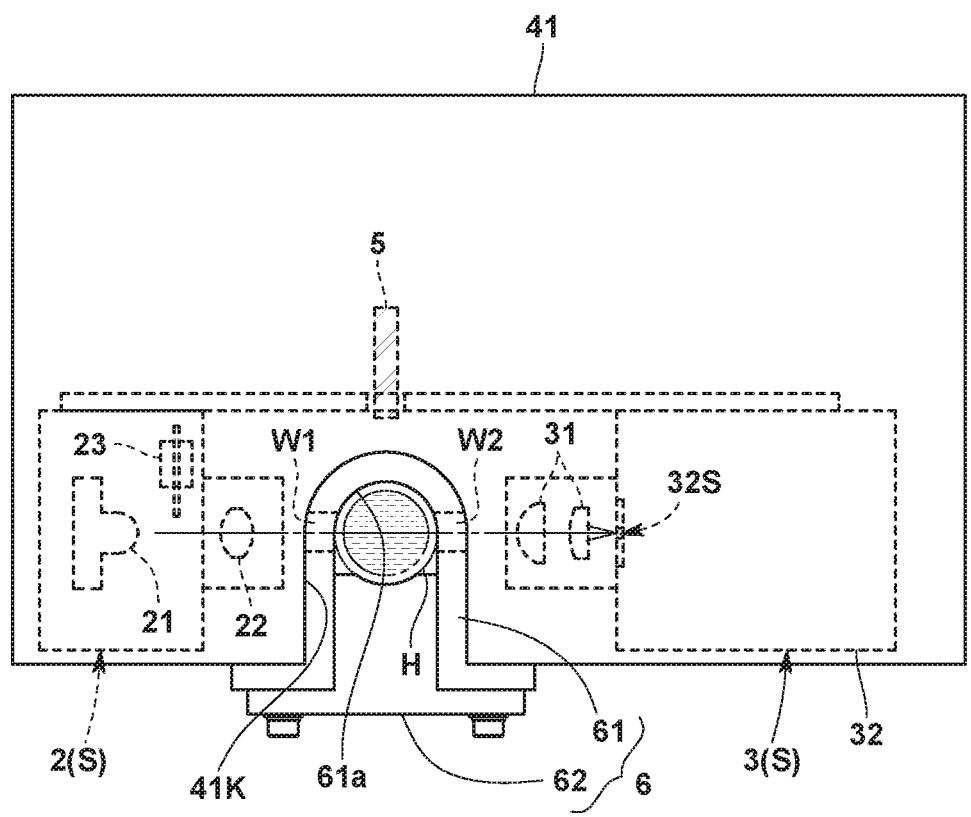
FIG. 5 is a plan view illustrating the details of a positioning part in the same embodiment.

In addition, as illustrated particularly in FIG. 5, the optical analyzer 100 of the present embodiment further includes a positioning part 6 that positions the center of the pipe H on the light axis of the light source unit 2 in the sample measurement position S.

The positioning part 6 is provided on the base member 41. Specifically, it is connected to the above-described cutout part 41K of the base member 41. In addition, the positioning part 6 includes an accommodation part 61 that accommodates the pipe H and a fixation part 62 that fixes the pipe H accommodated in the accommodation part 61.

The accommodation part 61 is one whose cross section is of a substantially U-shape and that accommodates a part of the pipe H along its axial direction. A curved surface part 61a of the inner surface of the accommodation part 61 has a curvature corresponding to the outer surface of the pipe H.

The accommodation part 61 of the present embodiment is provided between the light source unit 2 and the light detection unit 3 in the sample measurement position S, and the accommodation part 61 is formed with a light passage window W1 for guiding the light from the light source unit 2 to the pipe H and a light passage window W2 for guiding the light passing through the pipe H to the light detection unit 3. These two light passage windows W1 and W2 are formed in the mutually opposite side walls of the accommodation part 61. The accommodation part 61 is configured so that the outer surface of the pipe H contacts with the curved surface part 61a of the accommodation part 61 and thereby the central axis of the pipe H is positioned on the light path.

Also, the accommodation part 61 is configured to be attachable/detachable to/from the base member 41 by, for example, screws. This enables the central axis of the pipe H to be positioned on the light path regardless of the diameter of the pipe H by replacing with an accommodation part 61 corresponding to the diameter of the pipe H.

The fixation part 62 is one that presses the pipe H against the accommodation part 61 in a state of being attached to the accommodation part 61. The fixation part 62 presses the pipe H against the curved surface part 61a of the accommodation part 61 while contacting with a part of the outer surface of the pipe H. The fixation part 62 in the present embodiment is configured to be detachably attached to the accommodation part 61, but may be one that presses the pipe H against the accommodation part 61 in a state of being detachably attached to a member other than the accommodation part 61.

Further, in the present embodiment, the above-described respective components 2 to 6 are contained in a casing 11 as illustrated in drawings such as FIG. 1. The casing 11 contains the above-described respective components 2 to 6 except for an opening part of the accommodation part 61 so that the accommodation part 61 can accommodate the pipe H. Also, the base member 41 of the support mechanism 4 is fixed to the casing 11. The casing 11 is fixed to a peripheral member of the pipe H via an unillustrated bracket. In addition, the casing 11 is connected to the information processor COM by a signal cable.

<2. Analysis Method Using Optical Analyzer 100>

Next, an analysis method using the optical analyzer 100 of the present embodiment will be described.

First, the optical analyzer 100 is installed in the vicinity of the pipe H.

Then, the pipe H is accommodated in the accommodation part 61 of the optical analyzer 100 and the fixation part 62 is attached. In doing so, the pipe H is positioned with respect to the optical analyzer 100.

In this state, the optical analyzer 100 performs the reference measurement (see FIG. 2) and the sample measurement (see FIG. 1). In the reference measurement, a control part of the information processor COM controls the slide drive part 43 of the support mechanism 4 so that the light source unit 2 and the light detection unit 3 take the reference measurement position R, and the light of the light source unit 2 passes through the reference optical member 5 and is detected by the light detection unit 3 (see FIG. 2). On the other hand, in the sample measurement, the control part of the information processor COM controls the slide drive part 43 of the support mechanism 4 so that the light source unit 2 and the light detection unit 3 take the sample measurement position S, and the light of the light source unit 2 passes through the pipe H and is detected by the light detection unit 3 (see FIG. 1).

In addition, the shutter mechanism 23 provided in the light source unit 2 is controlled by the control part of the information processor COM, and thereby the light of the light source 21 of the light source unit 2 is shut off to perform dark measurement that acquires a detection signal of the light detection unit 3 in a lightless state. The detection signal acquired by the dark measurement is used to correct detection signals of the light detection unit 3 acquired by the reference measurement and the sample measurement.

<3. Effects of Present Embodiment>

The optical analyzer 100 of the present embodiment configured as described above is configured to, between the sample measurement position S and the reference measurement position R, move the light source unit 2 including the light source 21 and the condenser lens 22 and the light detection unit 3 that detects the light of the light source unit 2, and therefore as compared with a configuration in which a pair of reflective mirrors is moved as conventional, a change in light path length can be reduced. Also, the condenser lens 22 of the light source unit 2 condenses the light of the light source 21 inside of the pipe H in the sample measurement position S, and therefore even when the refractive index of the liquid sample is changed by a change in the temperature or concentration of the liquid sample, a change in refraction caused when the light passes through the pipe H and the liquid sample can be reduced. As a result, it is possible not only to keep the light path length the same between the sample measurement and the reference measurement but to make the effect of a change in the refractive index of the liquid sample less likely, and thereby improve measurement accuracy.

<4. Other Variations>

In addition, the present invention is not limited to the above-described embodiment.

For example, in the above-described embodiment, the linear guide 431 of the support mechanism 4 is provided only on the light detection unit 3 side, but may be provided to both of the light detection unit 3 and the light source unit 2. Alternatively, the linear guide 431 of the support mechanism 4 may be provided only on the light source unit 2 side.

Also, the support mechanism 4 in the above-described embodiment is configured so that the light source unit 2 and the light detection unit 3 are connected by the connecting member 42 and they are moved by the same slide drive part 43, but may be configured so that each of the light source unit 2 and the light detection unit 3 is provided with the slide drive part 43 and the light source unit 2 and the light detection unit 3 are independently moved.

Further, the support mechanism 4 in the above-described embodiment is one that, not only in the sample measurement position S and in the reference measurement position R but also in the middle of the movement between them, moves the light source unit 2 and the light detection unit 3 without changing the relative position between the light source unit 2 and the light detection unit 3; however, as long as the relative position between them is the same between the sample measurement position S and the reference measurement position R, the relative position between them may be changed in the middle of the movement.

In the above-described embodiment, the analyzer that analyzes the liquid sample such as a chemical is described; however, the analyzer may be one that analyzes a gas sample.

Besides, variations and combinations of various embodiments may be made without departing from the scope of the present invention.

REFERENCE SIGNS LIST

100: Optical analyzer
H: Pipe
2: Light source unit
21: Light source
22: Condenser lens
3: Light detection unit
4: Support mechanism
S: Sample measurement position
R: Reference measurement position
41: Base member
42: Connecting member
43: Slide drive part
431: Linear guide
6: Positioning part

The invention claimed is:

1. An optical analyzer that analyzes a sample flowing through a pipe having translucency, the optical analyzer comprising:
   a light source unit that has a light source and a condenser lens;
   a light detection unit that detects light of the light source unit; and
   a support mechanism that movably supports the light source unit and the light detection unit,
   wherein the support mechanism is one that moves the light source unit and the light detection unit between a sample measurement position allowing the light detection unit to detect the light of the light source unit via the pipe and a reference measurement position allowing the light detection unit to detect the light of the light source unit without the pipe, and further comprising
   a reference optical member positioned between the light source unit and the light detection unit in the reference measurement position, wherein
   the support mechanism further comprises:
   a fixedly provided base member; and
   a connecting member that connects between the light source unit and the light detection unit; and
   a slide drive part that is provided on the base member and slidingly moves the light source unit and the light detection unit with respect to the base member, the light source unit and the light detection unit being connected by the connecting member, wherein
   the connecting member is formed with an optical member avoiding part so as to avoid interference with the reference optical member when the light source unit and the light detection unit are moved to the sample measurement position.

2. The optical analyzer according to claim 1, wherein the condenser lens of the light source unit is one that condenses the light of the light source in an inside of the pipe in the sample measurement position.

3. The optical analyzer according to claim 1, wherein
the support mechanism is one that moves the light source unit and the light detection unit between the sample measurement position and the reference measurement position without changing a relative position between the light source unit and the light detection unit.

4. The optical analyzer according to claim 1, wherein
the slide drive part includes a linear guide provided interposed between the base member and the light detection unit, and
the light source unit and the light detection unit are movably supported by the linear guide with respect to the base member.

5. The optical analyzer according to claim 1, further comprising
a positioning part that performs positioning so that a center of the pipe is positioned on a light axis of the light source unit in the sample measurement position.

6. The optical analyzer according to claim 5, wherein
the positioning part is configured to be replaceable depending on a diameter of the pipe.

7. The optical analyzer according to claim 1, wherein
the optical member avoiding part is a through-hole.

\* \* \* \* \*